United States Patent
Bosch et al.

(10) Patent No.: US 7,826,849 B2
(45) Date of Patent: Nov. 2, 2010

(54) METHOD OF SHARING MOBILE UNIT STATE INFORMATION BETWEEN BASE STATION ROUTERS

(75) Inventors: Peter Bosch, New Providence, NJ (US); Sape J. Mullender, North Plainfield, NJ (US); Paul Anthony Polakos, Marlboro, NJ (US); Ajay Rajkumar, Morristown, NJ (US); Ganapathy S. Sundaram, Hillsborough, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 507 days.

(21) Appl. No.: 11/741,909

(22) Filed: Apr. 30, 2007

(65) Prior Publication Data
US 2008/0268853 A1    Oct. 30, 2008

(51) Int. Cl.
*H04W 40/00* (2009.01)
(52) U.S. Cl. .................. 455/445; 455/423; 455/425; 455/525; 370/338

(58) Field of Classification Search ................. 370/310, 370/328, 338; 455/423, 424, 425
See application file for complete search history.

(56) References Cited

U.S. PATENT DOCUMENTS

| 6,862,446 | B2 * | 3/2005 | O'Neill et al. | 455/422.1 |
| 2007/0070931 | A1 * | 3/2007 | Lewis et al. | 370/328 |
| 2007/0153720 | A1 * | 7/2007 | Baglin et al. | 370/328 |

* cited by examiner

*Primary Examiner*—Kamran Afshar
(74) *Attorney, Agent, or Firm*—Williams, Morgan & Amerson

(57) ABSTRACT

The present invention provides a method of operating a first base station router. The method may include transmitting state information associated with at least one inactive mobile unit to at least one second base station router. The state information is usable to initiate an active session with the at least one inactive mobile unit. The first base station router retains the state information for initiating an active session with the at least one inactive mobile unit and the least one second base station router is capable of initiating an active session with the at least one inactive mobile unit based on the state information when the state information is unavailable to the first base station router.

25 Claims, 2 Drawing Sheets

METHOD OF SHARING MOBILE UNIT STATE INFORMATION BETWEEN BASE STATION ROUTERS

BACKGROUND OF THE INVENTION

1. Field of the Invention

This invention relates generally to communication systems, and, more particularly, to wireless communication systems.

2. Description of the Related Art

In conventional wireless communications, one or more mobile units may establish a wireless link to a Radio Access Network (RAN). The RAN architecture is typically hierarchical and call state information associated with each mobile unit call session is stored in a central repository, such as a Radio Network Controller (RNC), a Serving GPRS Support Node (SGSN), and the like. If the user of the mobile unit changes geographical location while the mobile unit is dormant, a paging process may be used to locate the mobile unit. For example, the paging process may be initiated when data intended for the mobile unit arrives at a radio network controller. Upon receiving the page, the mobile unit may re-activate the dormant session, in which case the appropriate call state information is retrieved from the central repository.

One alternative to the conventional hierarchical network architecture is a distributed architecture including a network of base station routers. For example, each base station router may combine RNC, SGSN, GGSN, FA and/or PDSN functions in a single entity that manages radio links between one or more mobile units and an outside network, such as the Internet. Base station routers wholly encapsulate the cellular access technology and may proxy functionality that utilizes core network element support to equivalent IP functions. For example, IP anchoring in a UMTS base station router may be offered through a Mobile IP Home Agent (HA) and the GGSN anchoring functions that the base station router proxies by through equivalent Mobile IP signaling. Compared to hierarchical networks, distributed architectures have the potential to reduce the cost and/or complexity of deploying the network, as well as the cost and/or complexity of adding additional wireless access points, e.g. base station routers, to expand the coverage of an existing network. Distributed networks may also reduce (relative to hierarchical networks) the delays experienced by users because packet queuing delays at the RNC and PDSN of hierarchical networks may be reduced or removed.

In a distributed network of base station routers, one or more mobile units may establish a call session with any one of the plurality of base station routers. When a mobile unit first registers with a base station router a mobile unit identifier (and a mapping between the current paging area and the mobile unit identifier) is created on the base station router. A link (e.g. a tunnel) is established between the layer-3 anchor (e.g. the Mobile IP HA and/or a traditional 3G network's GGSN) and the base station router that holds the mapping between the mobile identifier and the paging area. An incoming packet or call thus terminates at the last known base station router. The mobile unit and the serving base station router may also negotiate and/or generate state information associated with the mobile unit during the registration procedure to establish the call session or during the call session itself. The state information may include security information associated with the call session, subscription information for broadcast and/or multicast services such as MBMS, home agent keys, information that may be used to connect to signal gateways in the wireless communication system, other link layer information, and the like. The state information may then be used to support various services that are provided to the mobile unit. For example, the security information may be used to support secure authenticated communication between the mobile unit and the wireless communication system. For another example, the subscription information may be used to provide multimedia broadcasts and/or multicast to a subscriber.

Mobile units in the distributed wireless communication system may enter an inactive mode, such as a dormant mode, an idle mode, a sleep mode, and the like. Dormancy refers to the state of the mobile unit after an existing traffic channel between the mobile unit and a serving base station router has been torn down. Dormancy may be triggered by a user powering down the mobile unit, the absence of data requiring transmission, and the like. For example, the mobile unit may include a timer that starts when no data is being transmitted or received. If the timer expires, the mobile unit becomes dormant and the traffic channel may be torn down. Dormant mobile units do not have an active radio link with a base station router and the base station router only knows the location of a mobile unit within a particular paging area, which may be a large geographic area that includes numerous other base station routers.

Other inactive modes may also be implemented in the mobile unit. For example, the IEEE 802.16 standard defines two inactive modes: the sleep mode and the idle mode. The sleep mode is a pre-negotiated period of absence from the air interface associated with a serving base station router. Mobile units that are in sleep mode are unavailable for forward and/or reverse link traffic. During the unavailability interval, the serving base station router does not transmit any data to the mobile unit and the mobile unit may power down and/or perform other activities that do not require any communication with the base station router. Sleep mode activities may include scanning different frequencies, ranging of neighboring base station routers, and the like. The idle mode begins when a mobile unit transmits a de-registration message to the serving base station router. The serving base station router may then tear down the traffic channel associated with the idle mobile unit and release all information pertaining to the idle mobile unit's network connections. The mobile unit may only listen while in the idle mode and can only receive messages from its preferred base station router.

When the mobile unit is in an inactive mode, the serving base station router maintains paging information that may be used to locate the inactive mobile unit. For example, if information destined for the inactive mobile unit arrives at the serving base station router, then the serving base station router may initiate a paging procedure by transmitting paging messages via the base station routers in the paging area indicated by the stored paging information associated with the inactive mobile unit. The mobile unit may respond to the paging message and re-enter an active mode. Once the mobile unit has been located and the session re-activated, then communication over the air interface may resume. For example, the call, multicast transmission, broadcast, or other information that caused the page to be sent may be transmitted to the mobile unit. The communication between the mobile unit and the base station router may utilize other state information stored at the base station router, such as security information associated with the call session, subscription information for broadcast and/or multicast services, home agent keys, information that may be used to connect to signal gateways in the wireless communication system, and other link layer information.

In a conventional hierarchical system, the paging information and state information is stored in a central repository, such as a radio network controller. The paging state stored in the central repository is typically more stable than the paging state that is kept at the cell sites in base station routers because the central machines are better maintained and are operating in well conditioned environments. Moreover, failure recovery techniques can be used when paging state is kept centrally e.g. by duplicating the paging state between central network elements. If a cellular network provides failure recovery mechanisms, the central database with paging information (i.e. identifiers and routing areas) is shared between two or more well connected central elements. In case the primary fails, a secondary can be triggered (manually or automatically) to re-register as a new paging anchor for the mobile. Since networking facilities are typically well maintained in central locations, outages due to broken network links can typically be avoided.

In contrast, base station routers are often deployed at the edge of the wireless communication network in hostile environments (e.g. at a road side or in a building) and are generally not under the direct physical supervision of the provider. Thus, base station routers are more susceptible to processing failures, networking failures and restarts, e.g. due to aging of components in the base station router, as a result of intensive use of the base station router, as a result of exposure to harsh environmental conditions, as well as other reasons. When the base station router fails, state information such as the paging information for inactive mobile units associated with the base station router is lost. Consequently, the wireless communication system may not be able to locate the inactive mobile units associated with the failed base station router until these mobile units re-register with another base station router. Note that when two or more of such base station routers are part of the same paging area, the mobile will not re-register for as long as it has not found another paging area. Other state information, such as the security information associated with the inactive mobile unit and/or subscription information associated with the inactive mobile unit, may also be lost, which may result in a disruption of services provided to the inactive mobile unit. The inactive mobile units may not be aware that the base station router has failed and thus may not re-register with another base station router for a relatively long period of time, which may result in a relatively long disruption of services.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for operating a first base station router. The method may include transmitting state information associated with at least one inactive mobile unit to at least one second base station router. The state information is usable to initiate an active session with the at least one inactive mobile unit. The first base station router retains the state information for initiating an active session with the at least one inactive mobile unit and the least one second base station router is capable of initiating an active session with the at least one inactive mobile unit based on the state information when the state information is unavailable to the first base station router

BRIEF DESCRIPTION OF THE DRAWINGS

The invention may be understood by reference to the following description taken in conjunction with the accompanying drawings, in which like reference numerals identify like elements, and in which.

Figure 1:
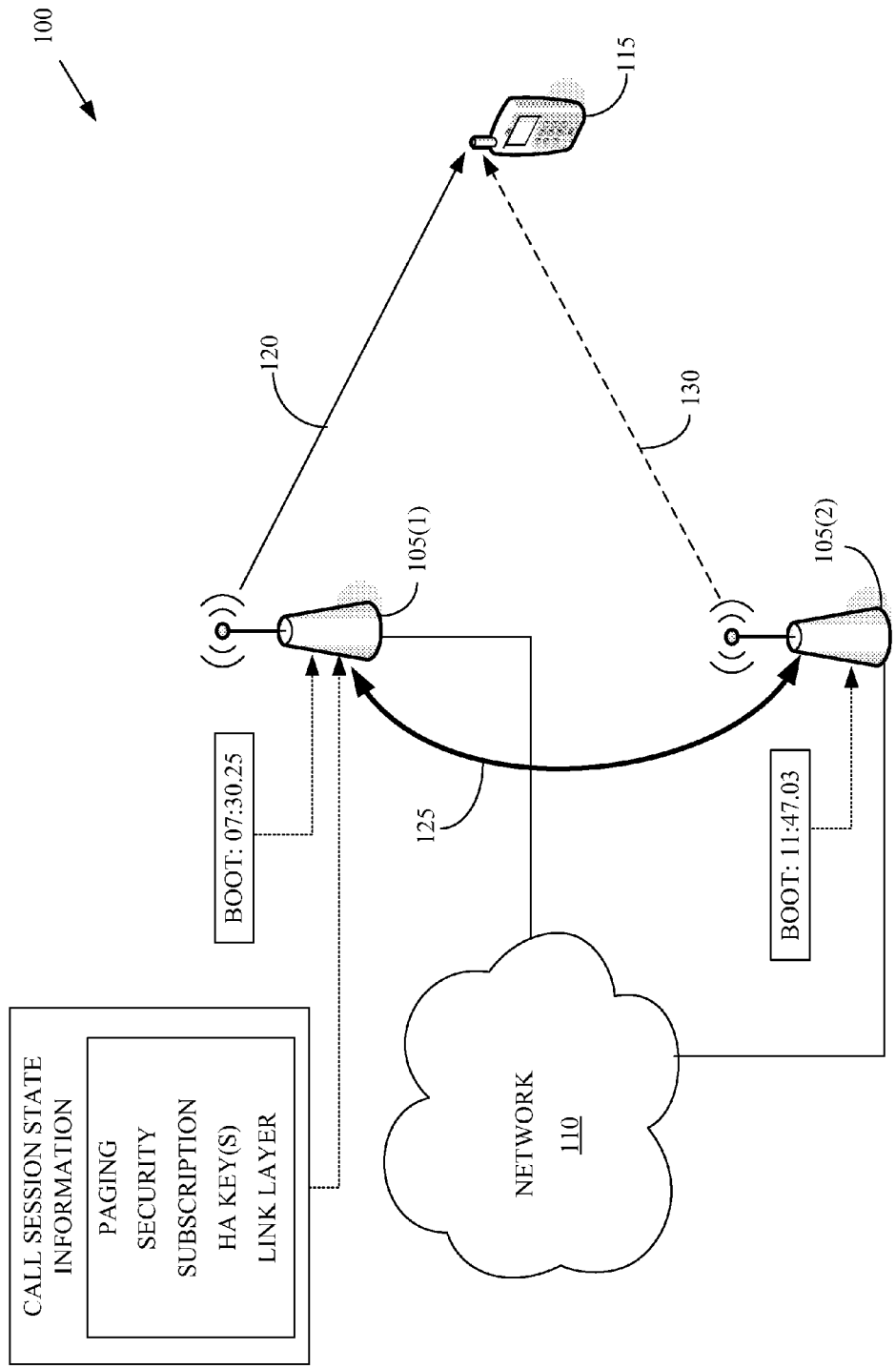
FIG. 1 conceptually illustrates a first exemplary embodiment of a distributed wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates a first exemplary embodiment of a distributed wireless communication system 100. In the illustrated embodiment, access points for the distributed wireless communication system 100 include a distributed network of base station routers 105(1-2). Hereinafter, in the interest of clarity, the base station routers 105(1-2) will be referred to collectively by the index 105 unless the description is referring to a specific base station router 105, such as the base station router 105(1). Although the present invention will be described in the context of the distributed wireless communication system 100 comprising a plurality of base station routers 105, persons of ordinary skill in the art should appreciate that the present invention is not limited to distributed wireless communication systems 100 in which the access points are base station routers 105. In alternative embodiments, the distributed wireless communication system 100 may include any desirable number and/or type of access point.

The base station routers 105 are communicatively coupled to a network 110. The base station routers 105 may be coupled to the network 110 by any combination of wired and/or wireless connections, which may operate according to any combination of wired and/or wireless communication standards and/or protocols. For example, the base station routers 105 and the network 110 may operate according to Universal Mobile Telecommunication System (UMTS) standards and/or protocols, such as defined by the Third Generation Partnership Project (3GPP). Other embodiments include operations using CDMA2000 EvDO (3GPP2), WiMAX (IEEE 802.16e). Each of the base station routers 105 may be capable of initiating, establishing, maintaining, transmitting, receiving, terminating, or performing any other desired action related to a call session with one or more mobile units, such as the mobile unit 115 shown in FIG. 1. For example, each base station router 105 may combine functions from Radio Network Controller (RNC), Serving GPRS Support Node (SGSN), Gateway GPRS Support Node (GGSN), Foreign Agent (FA) and Packet Data Serving Node (PDSN) functions in a single entity. The base station routers 105 may also be configured to communicate with other base station routers 105, other devices, other networks, and the like in a manner known to persons of ordinary skill in the art. Techniques for implementing and/or operating base station routers 105 are known in the art and in interest of clarity only those aspects of implementing and/or operating base station routers 105 that are relevant to the present invention will be discussed in detail herein.

In the illustrated embodiment, the mobile unit 115 registers with the base station router 105(1) to establish a call session. Each base station router 105 can create, assign, transmit, receive, and/or store information related to the call sessions established between the base station routers 105 and the mobile unit 115. This information will be collectively referred to hereinafter as state information, in accordance with common usage in the art. For example, the state information may include security information associated with the call session, subscription information for broadcast and/or multicast services such as MBMS, home agent keys, information that may be used to connect to signal gateways in the wireless communication system 100, other link layer information, information related to an air interface protocol, one or more sequence numbers, a re-sequencing buffer, and the like. The state information may also include information related to a Point-to-Point Protocol (PPP), such as header compression information, payload compression information, and related parameters. State information related to other protocol layers may also be created, transmitted, received, and/or stored by the base station routers 105. This state information may be negotiated and/or generated during the registration procedure to establish the call session or during the call session itself.

In one embodiment, the call-session state information includes a call session identifier, such as a Unicast Access Terminal Identifier (UATI), the Packet Temporary Mobile Subscriber Identity (P-TMSI), TMSI or Radio Network Temporary Identity (RNTI). The base station router 105(1) may create and/or store a mapping between the mobile unit identifier (e.g., the UATI, P-TMSI, TMSI, RNTI) and a paging area associated with the mobile unit 115 and the base station router 105(1). A link (e.g., a tunnel) may also be formed between the base station router 105(1) and a layer-3 anchor (not shown) in the network 110. For example, a link may be formed between the base station router 105(1) and a Mobile IP home agent (HA) in the network 110 and/or a core network in a traditional 3G network 1110. Incoming packets and/or calls may therefore be terminated at the base station router 105(1). The base station router 105(1) may also initiate a paging procedure over the paging area using the mobile identifier if the base station router 105(1) needs to locate the mobile unit 115 to establish a radio link, as indicated by the arrow 120.

The call session associated with the mobile unit 115 may be dormant. Dormancy refers to the state of the mobile unit 115 after an existing traffic channel between the mobile unit 115 and the base station router 105(1) has been torn down. In various alternative embodiments, dormancy may be triggered by a user powering down the mobile unit 115, silence in a voice communication, the absence of data requiring transmission, and the like. For example, the mobile unit 115 may include a timer that starts when no data is being transmitted or received. If the timer expires, the mobile unit 115 becomes dormant and the traffic channel may be torn down. Prior to becoming dormant, the mobile unit 115 carries out one or more pre-dormancy activities, such as migrating information between various base station routers 105. The dormant mobile unit 115 may be located using paging messages transmitted as part of a paging procedure initiated by the base station router 105(1) using paging state information stored on the base station router 105(1). However, the base station router 105(1) may not always be able to access the paging state information associated with the dormant mobile unit 115. For example, the base station router 105(1), or portions thereof, may fail or may be required to reboot for other reasons, which may result in loss of the paging state information, as well as other state information associated with the dormant mobile unit 115.

The base station router 105(1) may therefore select one or more "buddy" base station routers 105(2). Although a single buddy base station router 105(2) is shown in FIG. 1, persons of ordinary skill in the art having benefit of the present disclosure should appreciate that the wireless communication system 100 may include any number of buddy base station routers 105(2). In one embodiment, the buddy base station routers 105(2) are selected from among the base station routers 105 that are associated with the same paging area as the originating base station router 105(1). Paging state information associated with the dormant mobile unit 115 (and any other dormant mobile units associated with the base station router 105(1)) is then transmitted to the buddy base station router 105(2), as indicated by the arrow 125. In one embodiment, other state information may also be replicated to the buddy base station router 105(2). For example, the originating base station router 105(1) may transmit security information associated with the call session, subscription information for broadcast and/or multicast services such as MBMS, home agent keys, identities, information that may be used to connect to signal gateways in the wireless communication system, other link layer information, and the like to the buddy base station router 105(2).

The buddy base station routers 105(2) may be selected based on any criteria. In one embodiment, the buddy base station routers 105(2) associated with the originating base station router 105(1) may be pre-configured and this pre-configuration can be based on network topology considerations. Alternatively, the buddy base station routers 105(2) may be selected dynamically based on current network conditions and/or topology. The state information associated with the mobile unit 115 may be replicated in the buddy base station routers 105(2) at any time. In one embodiment, the state information associated with the mobile unit 115 may be replicated to the buddy base station routers 105(2) in response to the mobile unit 115 registering with the originating base station router 105(1). Alternatively, the state information associated with the mobile unit 115 may be replicated to the buddy base station routers 105(2) in response to the mobile unit 115 becoming inactive, e.g. as part of a pre-dormancy migration procedure.

Once the state information is shared between the originating base station router 105(1) and the buddy base station router 105(2), both base station routers 105 execute a keep-alive protocol to determine if both parties are still reachable. The originating base station router 105(1) should determine whether the buddy base station router 105(2) retains the state information that was transmitted to it, and the buddy base station router 105(2) should determine whether the layer-3 anchor (such as a Mobile IP HA and/or a traditional 3G core network) can still communicate with the paging state stored in the originating base station router 105(1). If the buddy base station router 105(2) determines that the paging state has become unreachable, it assumes the responsibility of the originating base station router 105(1). For example, the buddy base station router 105(2) may register (with the layer-3 anchor, home agent, and/or traditional 3G core network in the network 110) as the originating base station router 105 of the paging state of the dormant mobile unit 115. Incoming calls or downlink data (e.g. IP packets) are then directed to the new originating base station router 105(2) instead of the old originating base station router 105(1), as indicated by the dashed arrow 130. The new originating base station router 105(2) also selects another buddy or buddies to make sure the state information associated with the dormant mobile unit 115 is replicated again. The state information may then be replicated to the newly selected buddy base station routers 105(2).

As discussed above, each originating base station router 105(1) may select more than one buddy base station router 105(2) to maintain paging states. In various embodiments, the buddy base station routers 105(2) may each maintain copies of state information associated with all of the dormant mobile units 115 associated with the originating base station router 105(1). Alternatively, the state information associated with portions of the dormant mobile units 115 associated with the originating base station router 105(1) may be distributed to different buddy base station routers 105(2). When multiple buddy base station routers 105 are selected, the buddy base station routers 105(2) and the originating base station router 105(1) form a group that uses group decision making and/or negotiation techniques to determine when the paging state has become unreachable or unavailable to either the buddy or originating base stations 105. Such group decision-making and/or negotiation techniques can be based on well known techniques in the distributed systems arts, such as group voting.

In one embodiment, the paging state (as well as other state information) may be lost if the originating base station router 105(1) reboots. Thus, the originating base station router 105 can determine that the state information stored in a buddy base station router has become unavailable if the buddy base station router 105(2) has rebooted. Once a buddy base station router 105(2) has taken ownership of a paging state, it periodically transmits information indicating the most recent boot (or re-boot) time to the originating base station router 105(1). If the originating base station router 105(1) does not hear from the buddy base station router 105(2) within a pre-established amount of time or if the boot time has changed for the buddy base station router 105(2), the originating base station router 105(1) can deduce that the paging state was lost. If the originating base station router 105(1) deduces the state was lost, it can pick a new buddy base station router 105(2) and re-distribute the paging state.

Each buddy base station router 105(2) also periodically probes the originating base station router 105(1) for information indicating the most recent boot time of the originating base station router 105(1). The boot time informs the buddy base station router 105(2) whether the originator still holds the paging state for a mobile unit 115. When the originating base station router 105(1) stops sending the boot time or transmits a different time, the buddy base station router 105(2) re-registers the state in the layer 3 anchor and/or traditional 3G core network in the network 110 because the buddy base station router 105(2) can assume the originating base station router 105(1) has lost its state. Additionally, the buddy base station router 105(2) may assume the role of the originator and pick one or more buddy base station routers 105.

The state information kept at the originating base station router 105(1) should be reachable from the layer-3 anchor and/or the traditional 3G core network in the network 110. The originating base station router 105(1) may periodically test whether these anchors can still reach the state. Testing whether the state is still reachable may be different for different types of core nodes. For instance, to test the reach-ability through a Mobile IP HA, it is sufficient to establish the Mobile IP binding to the originating base station router 105(1) by re-registering or by sending a test packet through the home address of the mobile. To test the reach-ability of the state through the traditional 3G core network, the originating base station router 105(1) can initiate a test call and verify the call arrives at the originating base station router 105(1). Generally, reach-ability of state at the originating base station router 105(1) is validated by making a test call through the core infrastructure. When the originating base station router 105(1) changes, or when the mobile unit 115 detaches, a protocol is used to update the buddy base station router 105(1) of the changed environment.

Figure 2:
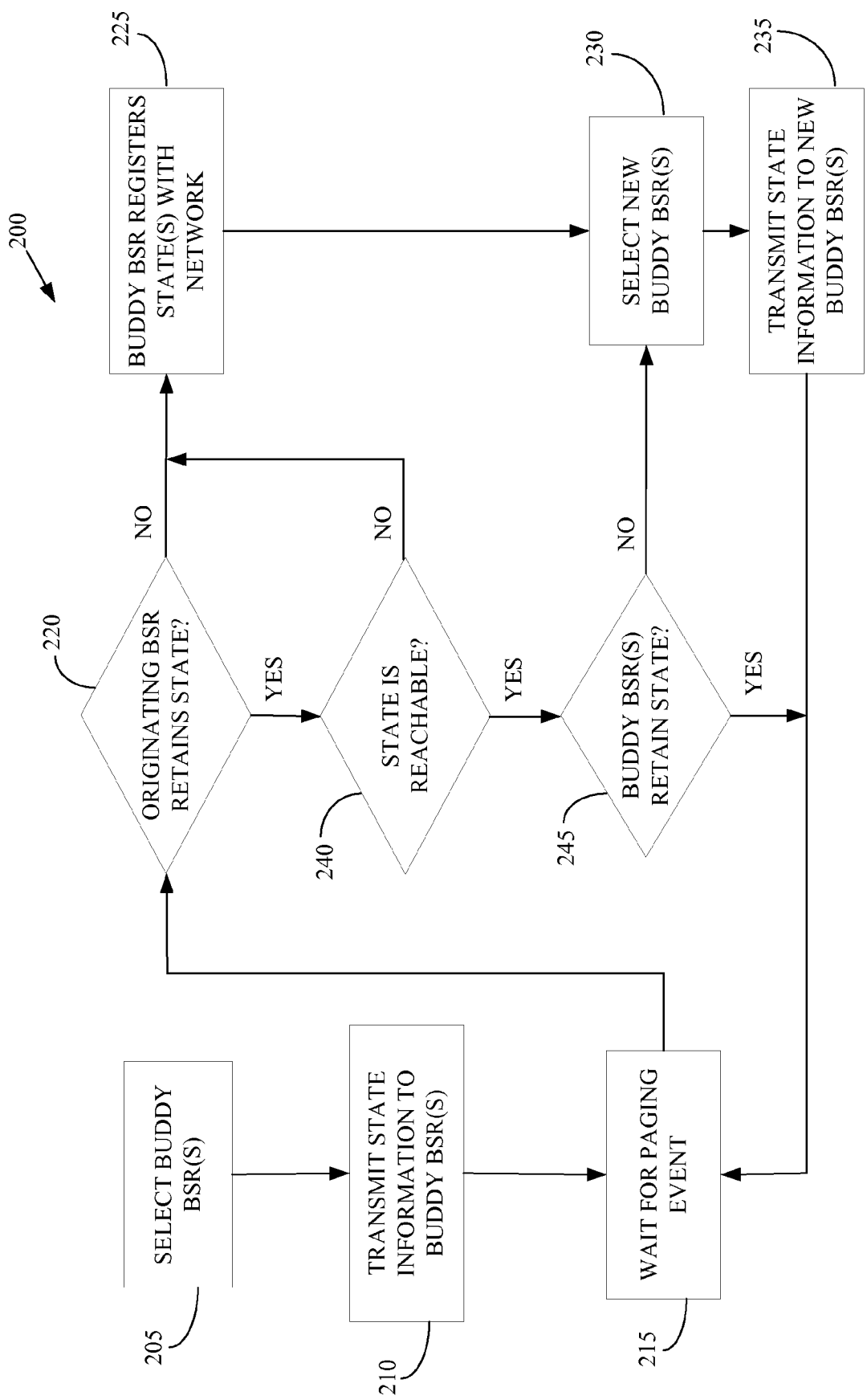
FIG. 2 conceptually illustrates one exemplary embodiment of a method 200 for operating originating and buddy base station routers, in accordance with the present invention.

FIG. 2 conceptually illustrates one exemplary embodiment of a method 200 for operating originating and buddy base station routers. In the illustrated embodiment, an originating base station router selects (at 205) one or more buddy base station routers. The originating base station router may then transmit (at 210) state information, such as paging state information, associated with one or more mobile units to one or more of the buddy base station routers. As discussed above, when multiple buddy base station routers are selected (at 205), the originating base station router may replicate state information associated with all mobile units in all of the buddy base station routers or may distribute state information associated with the mobile units throughout the buddy base station routers according to any scheme or protocol. The originating base station router also retains the state information. The originating base station router may then wait (at 215) for a paging event, such as arrival of data packets and/or voice communications destined for one of the mobile units associated with the state information.

The buddy base station routers may periodically determine (at 220) whether or not the originating base station router retains the state information that is replicated in the buddy base station routers. For example, as discussed above, the buddy base station router may request and/or receive information indicating the most recent boot time of the originating base station router. If the buddy base station router determines (at 220) that the state information is available to the originating base station router, then the originating base station router continues to be responsible for the state information associated with the mobile units. If the buddy base station router determines (at 220) that the state information is not available to the originating base station router, e.g., because the originating base station router has rebooted, then the buddy base station router may assume responsibility for the state information associated with the mobile unit and may register (at 225) the call session indicated by the state information with the network. The buddy base station router, which has now become the originating base station router, may then select (at 230) one or more new buddy base station routers and transmit (at 235) state information to the new buddy base station routers. The new originating base station router may wait (at 215) for a paging event associated with the mobile units.

The communication system may also determine (at 240) whether the state information on the originating base station router is reachable, e.g., by a layer-3 anchor in the network. Reach-ability of the state information on the originating base station router may be determined (at 230) by providing various types of signaling to the network, as discussed above. If the state information on the originating base station router is reachable, then the originating base station router continues to be responsible for the state information associated with the mobile units. If the state information on the originating base station router is not reachable, then the buddy base station router may assume responsibility for the state information associated with the mobile unit and may register (at 225) the call session indicated by the state information with the network. The buddy base station router, which has now become the originating base station router, may then select (at 230) one or more new buddy base station routers and transmit (at 235) state information to the new buddy base station routers. The new originating base station router may wait (at 215) for a paging event associated with the mobile units.

The originating base station router may determine (at 245) whether one or more of the buddy base station routers retains the provided state information. For example, as discussed above, the originating base station router may request and/or receive information indicating the most recent boot time of each buddy base station router. If the originating base station router determines (at 245) that the state information is available to the buddy base station router, then the originating base station router maintains primary responsibility for the state information and continues to rely upon the buddy base station routers to replicate the state information associated with the mobile units. If the originating base station router determines (at 245) that the state information is no longer available to one or more of the buddy base station routers, then the originating base station router may select (at 230) one or more new buddy base station routers to replace the previous buddy base station routers that no longer have access to the state information. The originating base station router may then transmit (at 235) state information to the new buddy base station routers. The originating base station router may continue to wait (at 215) for a paging event associated with the mobile units.

Although FIG. 2 depicts the steps 220, 240, 245 as occurring sequentially and in a particular order, persons of ordinary skill in the art having benefit of the present disclosure should appreciate that the present invention is not limited to this embodiment. In alternative embodiments, the steps 220, 240, 245 may occur in any order, as well as concurrently and/or simultaneously. Furthermore, the steps 220, 240, 245 do not necessarily require that any of the other steps 220, 240, 245 be performed. For example, any one of the steps 220, 240, 245, or any combination thereof, may be performed one or more times without necessarily performing any other of the steps 220, 240, 245.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method of operating a first base station router, comprising:
   transmitting, from the first base station router to at least one second base station router, state information that was created when at least one inactive mobile unit registered at least one call session with the first base station router the first base station router retaining the state information for activating said at least one call session with said at least one inactive mobile unit, and said at least one second base station router being configured to activate said at least one call session with said at least one inactive mobile unit using the state information in response to the state information becoming unavailable to the first base station router.

2. The method of claim 1, wherein transmitting the state information comprises transmitting at least one of paging state information, security information, subscription information, home agent keys, identities, information used to connect to signal gateways in the wireless communication system, or link layer state information.

3. The method of claim 1, further comprising determining whether the transmitted state information associated with said at least one inactive mobile unit is available to said at least one second base station router.

4. The method of claim 1, comprising receiving, at the first base station router, a request for information from said at least one second base station router and providing at least one response to the request for information such that said at least one second base station router can determine, based on a boot time included in said at least one response, whether the state information is available to the first base station router.

5. The method of claim 1, further comprising determining whether the first base station router is communicatively coupled to at least one network for receiving information destined for said at least one inactive mobile unit.

6. The method of claim 1, wherein transmitting the state information comprises transmitting the state information in response to said at least one mobile unit becoming associated with the first base station router.

7. A method of operating a first base station router, comprising:
transmitting state information associated with at least one inactive mobile unit to at least one second base station router, wherein the state information is used to initiate an active session with said at least one inactive mobile unit, the first base station router retaining the state information for initiating an active session with said at least one inactive mobile unit, said at least one second base station router being configured to initiate an active session with said at least one inactive mobile unit based on the state information in response to the state information becoming unavailable to the first base station router; and;
determining whether the transmitted state information associated with said at least one inactive mobile unit is available to said at least one second base station router by determining whether said at least one second base station router has provided information indicative of a boot time of said at least one second base station router.

8. The method of claim 7, wherein determining whether the transmitted state information associated with said at least one inactive mobile unit is available to said at least one second base station router comprises determining that the transmitted state information associated with said at least one inactive mobile unit is available to said at least one second base station router when said at least one second base station router has provided information indicative of a boot time within a selected time period and the provided information indicative of the boot time indicates that said at least one second base station router has not been rebooted.

9. The method of claim 7, wherein determining whether the transmitted state information associated with said at least one inactive mobile unit is available to said at least one second base station router comprises determining that the transmitted state information associated with said at least one inactive mobile unit is not available to said at least one second base station router when said at least one second base station router has not provided information indicative of a boot time within a selected time period or when the provided information indicative of the boot time indicates that said at least one second base station router has been rebooted.

10. The method of claim 9, comprising at least one of:
re-transmitting the state information to said at least one second base station router in response to determining that the transmitted state information associated with said at least one inactive mobile unit is not available to said at least one second base station router; and
transmitting the state information to at least one third of a station router in response to determining that the transmitted state information associated with said at least one inactive mobile unit is not available to said at least one second base station router.

11. A method of operating a first base station router, comprising:
receiving, at the first base station router from at least one second base station router, state information created when at least one inactive mobile unit registered at least one call session with said at least one second base station router, said at least one second base station router retaining the state information for activating said at least one call session with said at least one inactive mobile unit, and the first base station router retaining the state information for activating said at least one call session with said at least one inactive mobile unit in response to the state information becoming unavailable to said at least one second base station router.

12. The method of claim 11, wherein receiving the state information comprises receiving at least one of paging state information, security information, subscription information, identities, home agent keys, information used to connect to signal gateways in the wireless communication system, or link layer state information.

13. The method of claim 11, further comprising determining whether the transmitted state information associated with said at least one inactive mobile unit is available to said at least one second base station router.

14. The method of claim 13, wherein determining whether the transmitted state information is available to said at least one second base station router comprises transmitting a request for information to said at least one second base station router.

15. The method of claim 11, comprising providing, to said at least one second base station router, a boot time of the first base station router that permits said at least one second base station router to determine whether the state information is available to the first base station router.

16. The method of claim 11, wherein receiving the state information comprises receiving the state information in response to said at least one mobile unit becoming associated with the second base station router.

17. A method of operating a first base station router, comprising:
receiving state information associated with at least one inactive mobile unit from at least one second base station router, wherein the state information is used to initiate an active session with said at least one inactive mobile unit, said at least one second base station router retaining the state information for initiating an active session with said at least one inactive mobile unit, and the first base station router retaining the state information for initiating an active session with said at least one inactive mobile unit in response to the state information becoming unavailable to the second base station router; and determining whether the transmitted state information associated with said at least one inactive mobile unit is available to said at least one second base station router by:

transmitting a request for information to said at least one second base station router; and receiving information indicative of a boot time of said at least one second base station router in response to transmitting the request for information.

18. The method of claim 17, wherein determining whether the transmitted state information is available to said at least one second base station router comprises determining that the transmitted state information is available to said at least one second base station router when said at least one second base station router has provided information indicative of a boot time within a selected time period and the provided information indicative of the boot time indicates that said at least one second base station router has not been rebooted.

19. The method of claim 17, wherein determining whether the transmitted state information is available to said at least one second base station router comprises determining that the transmitted state information is not available to said at least one second base station router when said at least one second base station router has not provided information indicative of a boot time within a selected time period or when the provided information indicative of the boot time indicates that said at least one second base station router has been rebooted.

20. The method of claim 19, comprising:

registering at least one state associated with said at least one inactive mobile unit in response to determining that the transmitted state information is not available to said at least one second base station router; and transmitting the state information associated with said at least one active mobile unit to at least one third base station router in response to determining that the transmitted state information is not available to said at least one second base station router.

21. A method, comprising:

selecting, at a base station router, at least one buddy base station router to assume responsibility for at least one inactive call session maintained by the base station router in response to call session state information for said at least one inactive call session becoming unavailable to the base station router; and transmitting, from the base station router to said at least one buddy base station router, the call session state information for said at least one inactive call session.

22. The method of claim 21, comprising determining, at the base station router, that the call session state information for said at least one inactive call session has become unavailable to said at least one buddy base station router.

23. The method of claim 22, comprising retransmitting, from the base station router to said at least one buddy base station router, the call session state information for said at least one inactive call session when the call session state information has become unavailable to said at least one buddy base station router.

24. A method, comprising:

configuring a buddy base station router to assume responsibility for at least one inactive call session previously established with a base station router in response to call session state information for said at least one inactive call session becoming unavailable to the base station router, configuration being performed using call session state information for said at least one inactive call session established by the base station router, and wherein the call session state information is transmitted to the buddy base station router by the base station router.

25. The method of claim 24, comprising activating said at least one inactive call session using the call session state information in response to detecting a page associated with said at least one inactive call session.

* * * * *